US012804634B2

(12) United States Patent
Harada et al.

(10) Patent No.: US 12,804,634 B2
(45) Date of Patent: Nov. 17, 2026

(54) TERMINAL AND BASE STATION FOR SCHEDULING A PLURALITY OF CELLS

(71) Applicant: NTT DOCOMO, INC., Tokyo (JP)

(72) Inventors: Hiroki Harada, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 341 days.

(21) Appl. No.: 17/791,129

(22) PCT Filed: Jan. 10, 2020

(86) PCT No.: PCT/JP2020/000771

§ 371 (c)(1),
(2) Date: Jul. 6, 2022

(87) PCT Pub. No.: WO2021/140677

PCT Pub. Date: Jul. 15, 2021

(65) Prior Publication Data

US 2023/0048526 A1 Feb. 16, 2023

(51) Int. Cl.
*H04W 72/1263* (2023.01)
*H04L 1/1812* (2023.01)
*H04W 72/23* (2023.01)

(52) U.S. Cl.
CPC ....... *H04W 72/1263* (2013.01); *H04W 72/23* (2023.01); *H04L 1/1812* (2013.01)

(58) Field of Classification Search
None
See application file for complete search history.

(56) References Cited

U.S. PATENT DOCUMENTS

2013/0107836 A1 5/2013 Miki et al.
2014/0057640 A1* 2/2014 Nagata .................. H04W 72/04 455/450
2016/0007357 A1 1/2016 Yano et al.
2018/0123769 A1* 5/2018 Pelletier .................. H04L 5/001
2020/0145964 A1* 5/2020 Sengupta ............. H04L 1/0031
(Continued)

FOREIGN PATENT DOCUMENTS

JP 2012-005074 A 1/2012
WO 2014/147673 A1 9/2014
WO 2016105978 A1 6/2016
(Continued)

OTHER PUBLICATIONS

Extended European Search Report issued in European Application No. 20912022.9, mailed on Aug. 11, 2023 (9 pages).
(Continued)

*Primary Examiner* — Saad Khawar
(74) *Attorney, Agent, or Firm* — Osha Bergman Watanabe & Burton LLP

(57) ABSTRACT

A terminal includes: a receiving unit receiving single control information for scheduling a plurality of cells; and a control unit receiving a transport block from the plurality of cells, based on the control information, in which the control unit: receives different transport blocks in each of the plurality of cells; receives a same transport block in each of the plurality of cells; or receives a part of a transport block in each of the plurality of cells.

2 Claims, 11 Drawing Sheets

(56) References Cited

U.S. PATENT DOCUMENTS

| | | | | |
|---|---|---|---|---|
| 2021/0219329 | A1* | 7/2021 | Zhou | H04L 1/1819 |
| 2022/0377813 | A1* | 11/2022 | Wang | H04L 1/1854 |

FOREIGN PATENT DOCUMENTS

| | | | |
|---|---|---|---|
| WO | 2016123393 | A1 | 8/2016 |
| WO | 2019117619 | A1 | 6/2019 |

OTHER PUBLICATIONS

International Search Report issued in PCT/JP2020/000771 on Sep. 8, 2020 (5 pages).
Written Opinion of the International Searching Authority issued in PCT/JP2020/000771 on Sep. 8, 2020 (4 pages).
Nokia, Nokia Shanghai Bell; "On cross-carrier scheduling with mixed numerologies"; 3GPP TSG RAN WG1 Meeting #96bis, R1-1904720; Xi'an, China; Apr. 8-12, 2019 (6 pages).
Ericsson; "New WID on NR Dynamic spectrum sharing (DSS)"; 3GPP TSG RAN Meeting #86, RP-193260; Sitges, Spain; Dec. 9-12, 2019 (4 pages).
3GPP TS 38.300 V15.7.0; "3rd Generation Partnership Project; Technical Specification Group Radio Access Network; NR; NR and NG-RAN Overall Description; Stage 2 (Release 15)"; Sep. 2019 (99 pages).

* cited by examiner

TERMINAL AND BASE STATION FOR SCHEDULING A PLURALITY OF CELLS

TECHNICAL FIELD

The present invention relates to a terminal and a communication method in a radio communication system.

BACKGROUND ART

In new radio (NR) (also referred to as "5G") that is the subsequent system of long term evolution (LTE), a technology satisfying a high-capacity system, a fast data transmission rate, low latency, simultaneous connection of a plurality of terminals, a low cost, power saving, and the like, as required conditions, has been discussed.

In the case of operating an NR system in the same band as that of the conventional LTE system, in order to improve a frequency utilization efficiency, dynamic spectrum sharing (NR-DSS) has been discussed for allowing the conventional LTE system and the NR system to coexist in the same band (for example, Non-Patent Document 2). In NR-DSS, for example, a resource used for transmitting a cell-specific reference signal or a control signal in the LTE system is excluded, and the signal of the NR system is transmitted by using the remaining resource.

In addition, an object of NR-DSS, for example, is to enhance a physical downlink control channel (PDCCH) for cross-carrier scheduling. As an example, a method for scheduling a physical downlink shared channel (PDSCH) or a physical uplink shared channel (PUSCH) of a primary cell or a primary secondary cell by using PDCCH of a secondary cell has been discussed. In addition, as another example, a method for scheduling PDSCH or PUSCH of a plurality of cells by using single downlink control information (DCI), through PDCCH of a primary cell, a primary secondary cell, or a secondary cell, has been discussed.

CITATION LIST

Non-Patent Document

Non-Patent Document 1: 3GPP TS 38.300 V15.7.0 (2019-09)
Non-Patent Document 2: 3GPP TSG RAN Meeting #86 RP-193260 (2019-12)

SUMMARY OF THE INVENTION

Problem to be Solved by the Invention

In a case where a base station schedules each PDSCH in the plurality of cells by using the single DCI, it is necessary for the terminal to identify how a transport block or a transport block configured of a plurality of code blocks is mapped in each of a plurality of scheduled cells, and to receive the transport block.

The invention has been made in view of the circumstances described above, and an object thereof is to enable a terminal to correctly receive a transport block from a plurality of cells, in a radio communication system.

Means for Solving Problem

According to the disclosed technology, a terminal including: a receiving unit receiving single control information for scheduling a plurality of cells; and a control unit receiving a transport block from the plurality of cells, based on the control information, in which the control unit: receives a different transport block in each of the plurality of cells; receives a same transport block in each of the plurality of cells; or receives a part of the transport block in each of the plurality of cells, is provided.

Effect of the Invention

According to the disclosed technology, it is possible for a terminal to correctly receive a transport block from a plurality of cells, in a radio communication system.

MODE FOR CARRYING OUT THE INVENTION

Hereinafter, an embodiment of the invention will be described with reference to the drawings. Note that, the embodiment described below is an example, and an embodiment to which the invention is applied is not limited to the following embodiment.

In the operation of a radio communication system of the embodiment of the invention, the conventional technology is suitably used. Here, the conventional technology, for example, is the conventional LTE, but is not limited to the conventional LTE. In addition, the term "LTE" used herein has a broad meaning including LTE-advanced and a scheme subsequent to the LTE-advanced (for example, NR), unless otherwise noted.

In addition, in the embodiment of the invention described below, terms such as a synchronization signal (SS), a primary SS (PSS), a secondary SS (SSS), a physical broadcast channel (PBCH), a physical random access channel (PRACH), a physical downlink control channel (PDCCH), a physical downlink shared channel (PDSCH), a physical uplink control channel (PUCCH), and a physical uplink shared channel (PUSCH), which are used in the conventional LTE, are used. This is for convenience of description, and signals, functions, and the like similar to the above may be referred to as other names. In addition, the terms in NR correspond to NR-SS, NR-PSS, NR-SSS, NR-PBCH, NR-PRACH, NR-PDCCH, NR-PUCCH, NR-PUSCH, and the like. Here, even in the case of a signal that is used in NR, it is not necessary to specify the signal with "NR-".

In addition, in the embodiment of the invention, a duplex may be a time division duplex (TDD), may be a frequency division duplex (FDD), or may be other schemes (for example, a flexible duplex or the like).

In addition, in the embodiment of the invention, "configuring" a radio parameter or the like may be pre-configuring a predetermined value, or may be configuring a radio parameter that is indicated by a base station 10 or a terminal 20.

Figure 1:
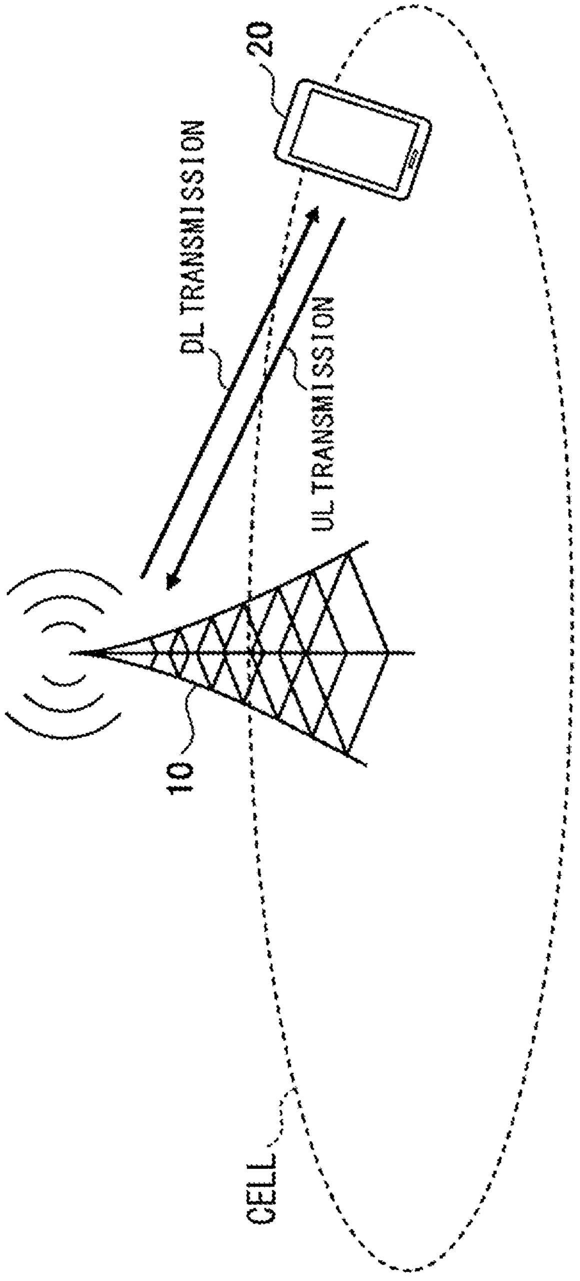
FIG. 1 is a diagram illustrating a configuration example (1) of a radio communication system in an embodiment of the invention.

FIG. 1 is a diagram illustrating a configuration example (1) of a radio communication system in the embodiment of the invention. As illustrated in FIG. 1, the radio communication system includes the base station 10 and the terminal 20. In FIG. 1, one base station 10 and one terminal 20 are illustrated, but this is an example, and a plurality of base stations 10 and a plurality of terminals 20 may be provided. Note that, the terminal 20 may be referred to as a "user equipment". In addition, the radio communication system in this embodiment may be referred to as an NR-U system.

The base station 10 is a communication unit that provides one or more cells and performs radio communication with respect to the terminal 20. A physical resource of a radio signal is defined by a time domain and a frequency domain, the time domain may be defined by a slot or an OFDM symbol, and the frequency domain may be defined by a subband, subcarrier, or a resource block.

As illustrated in FIG. 1, the base station 10 transmits control information or data to the terminal 20 by a downlink (DL), and receives control information or data from the terminal 20 by an uplink (UL). Both of the base station 10 and the terminal 20 are capable of performing transmission and reception with respect to the signal by performing beam forming. In addition, both of the base station 10 and the terminal 20 are capable of applying the communication of multiple input multiple output (MIMO) by DL or UL. In addition, both of the base station 10 and the terminal 20 may perform communication through a secondary cell (SCell) and a primary cell (PCell) according to carrier aggregation (CA).

The terminal 20 is a communication unit having a radio communication function of a smart phone, a mobile phone, a tablet, a wearable terminal, a communication module for machine-to-machine (M2M), and the like. As illustrated in FIG. 1, in the terminal 20, the control information or the data is received from the base station 10 by DL, and the control information or the data is transmitted to the base station 10 by UL, and thus, various communication services to be provided by the radio communication system are used.

Figure 2:
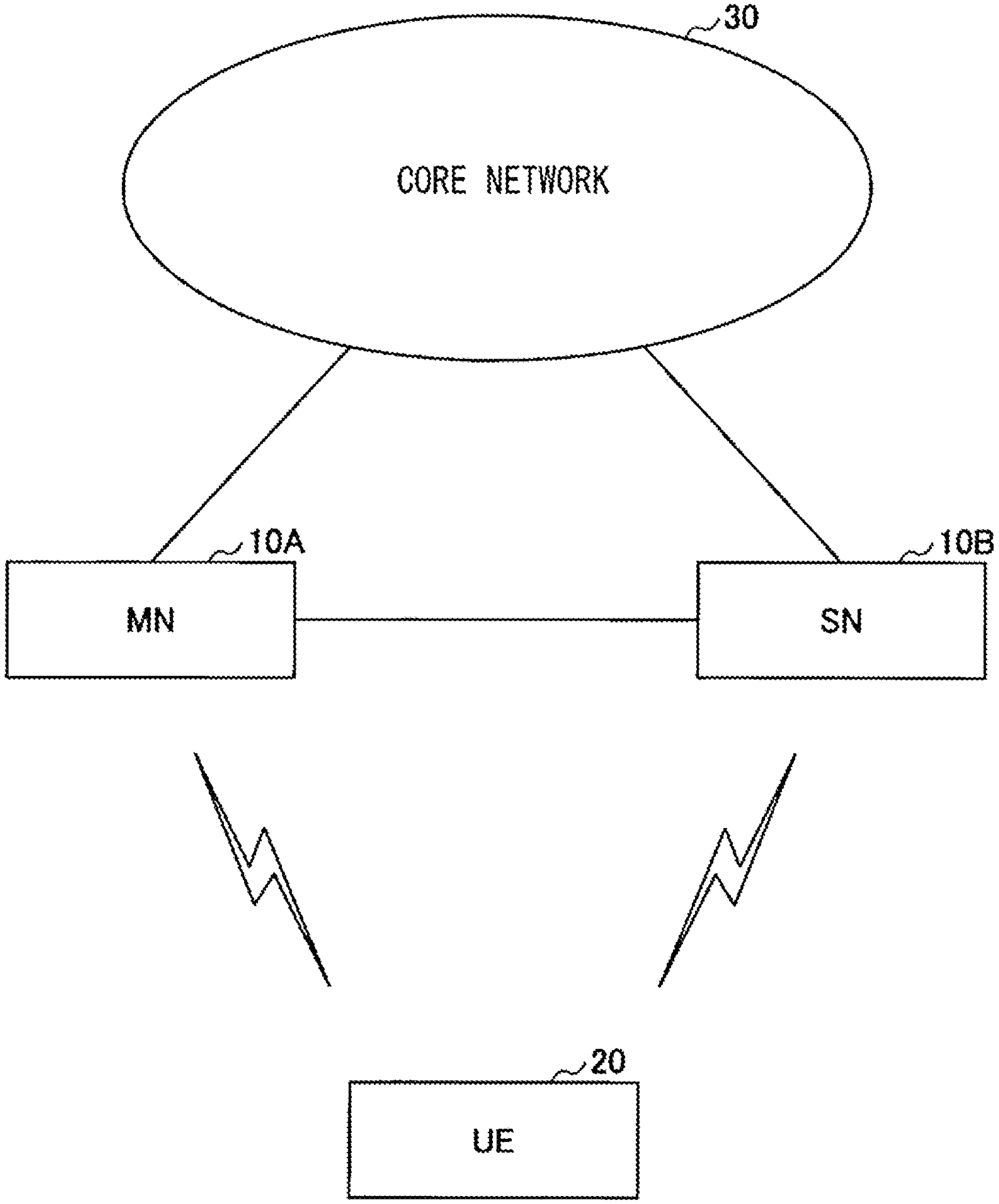
FIG. 2 is a diagram illustrating a configuration example (2) of the radio communication system in the embodiment of the invention.

FIG. 2 is a diagram illustrating a configuration example (2) of the radio communication system in the embodiment of the invention. FIG. 2 illustrates a configuration example of the radio communication system in a case where NR-dual connectivity (NR-DC) is executed. As illustrated in FIG. 2, a base station 10A that is a master node (MN) and a base station 10B that is a secondary node (SN) are provided. Each of the base station 10A and the base station 10B is connected to a core network 30. The terminal 20 performs communication with respect to both of the base station 10A and the base station 10B.

A cell group to be provided by the base station 10A that is MN is referred to as a master cell group (MCG), and a cell group to be provided by the base station 10B that is SN is referred to as a secondary cell group (SCG). The following operation may be performed by any configuration of FIG. 1 and FIG. 2.

Here, an object of NR-DSS, for example, is to enhance PDCCH for cross-carrier scheduling. As an example, a method for scheduling a physical downlink shared channel (PDSCH) or a physical uplink shared channel (PUSCH) of a primary cell or a primary secondary cell by PDCCH of a secondary cell has been discussed. In addition, as another example, a method for scheduling PDSCH of a plurality of cells by using single downlink control information (DCI), through PDCCH of a primary cell, a primary secondary cell, or a secondary cell has been discussed. Hereinafter, a "cell", a "carrier", a "component carrier (CC)", or a "serving cell" may be replaced with each other, or may be described in a non-distinguishable manner.

Figure 3:
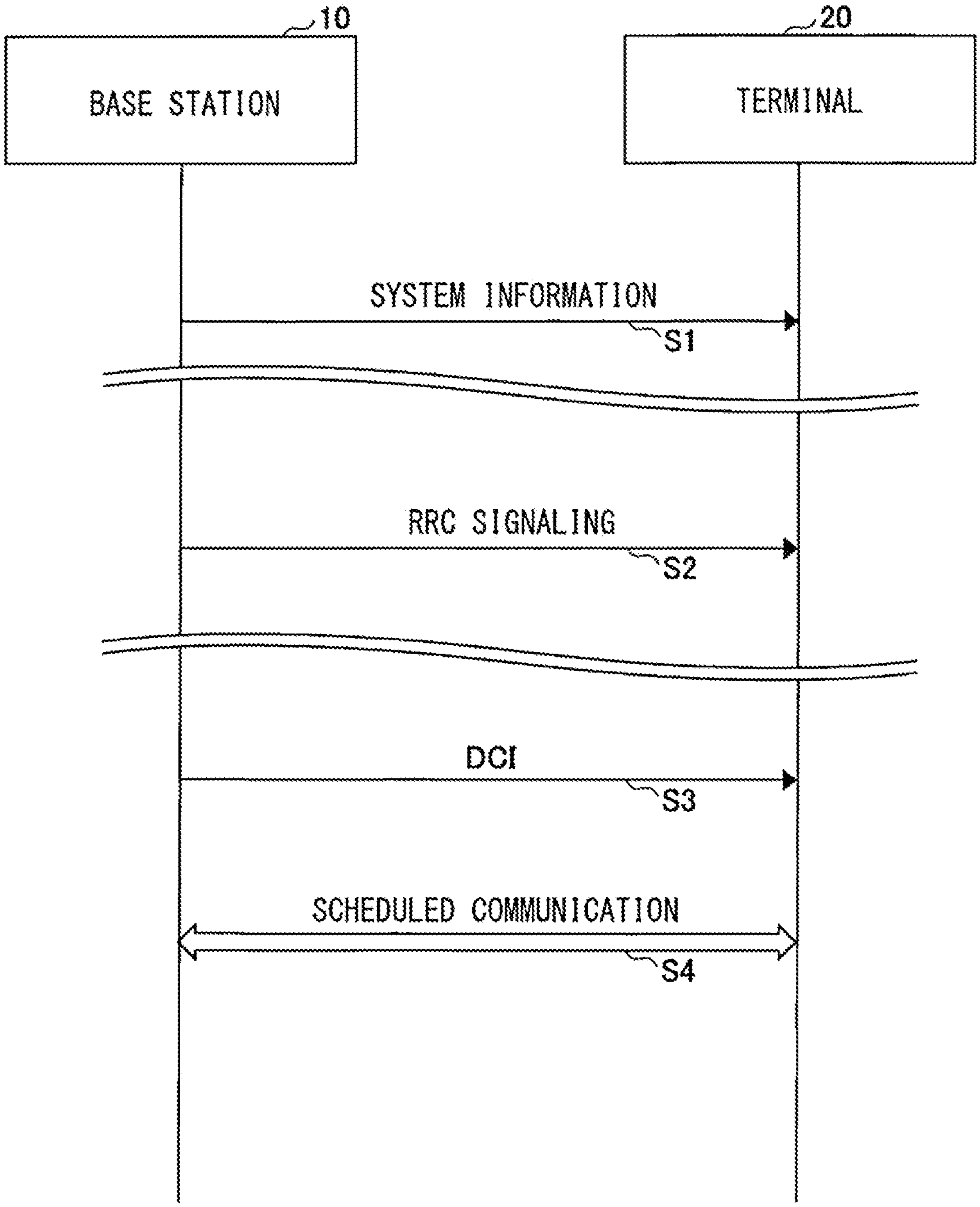
FIG. 3 is a sequence diagram illustrating a signaling example in the embodiment of the invention.

FIG. 3 is a sequence diagram illustrating a signaling example in the embodiment of the invention. As illustrated in FIG. 3, in step S1, the base station 10 may transmit system information including a specific information element (IE) to the terminal 20. Alternatively, in step S2, the base station 10 may individually transmit RRC signaling including the specific IE to the terminal 20. Either of step S1 or step S2 may be executed, or an execution order may be reversed. The specific IE, for example, may be at least one of a system information block 1 (SIB1), another SIB, servingCellConfig, or the like. The configuration according to the scheduling using DCI may be executed by at least one of step S1 and step S2. In step S3, the base station 10 schedules PDSCH or PUSCH of a plurality of cells or a single cell to the terminal 20 by DCI. In step S4, the terminal 20 executes scheduled communication with the base station 10. The scheduled communication may be DL, or may be UL.

Figure 4:
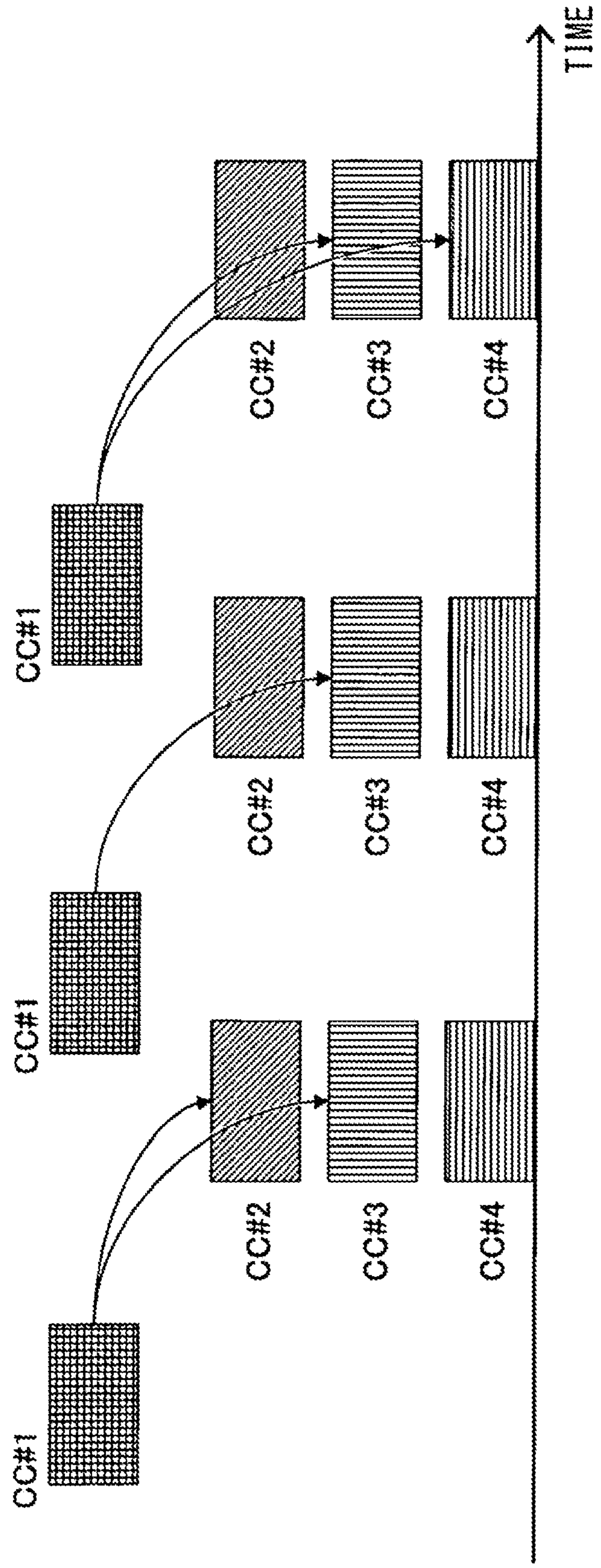
FIG. 4 is a diagram illustrating a scheduling example of a single cell or a plurality of cells using single DCI.

FIG. 4 is a scheduling example of the single cell or the plurality of cells using single DCI. As illustrated in FIG. 4, for example, PDSCHs of CC #2 and CC #3 are scheduled by cross-carrier scheduling by using DCI that is transmitted to the terminal 20 from the base station 10 through PDCCH of CC #1. This cross-carrier scheduling is an example of scheduling a plurality of cells by using single control information. In addition, as illustrated in FIG. 4, for example, PDSCH of CC #3 is scheduled by cross-carrier scheduling by using DCI that is transmitted to the terminal 20 from the base station 10 through PDCCH of CC #1. This cross-carrier scheduling is an example of scheduling a single cell by using single control information. In addition, as illustrated in FIG. 4, for example, PDSCHs of CC #3 and CC #4 are scheduled by cross-carrier scheduling by using DCI that is transmitted to the terminal 20 from the base station 10 through PDCCH of CC #1. This cross-carrier scheduling is an example of scheduling a plurality of cells by using single control information. Hereinafter, a scheduled PDSCH may be replaced with a scheduled PUSCH. In addition, the cell itself that performs scheduling (CC #1 in the example of FIG. 4) may be one of the plurality of cells that are a scheduling target.

In the cross-carrier scheduling, a carrier indicator field (CIF) is used. CIF is used for designating a serving cell that is a scheduling target when PDCCH of the serving cell schedules a resource of the other serving cell. However, in the technology of the related art, there are following limitations represented by 1) to 3).

1) Primary cell (PCell) cannot be scheduled by cross-carrier scheduling. That is, the primary cell is always scheduled by its own PDCCH.
2) In a case where PDCCH is configured in a certain secondary cell (SCell), the secondary cell is always scheduled by its own PDCCH.
3) In a case where PDCCH is not configured in a certain secondary cell, PDSCH and PUSCH of the secondary cell are always scheduled by PDCCH in another serving cell.

Figure 5:
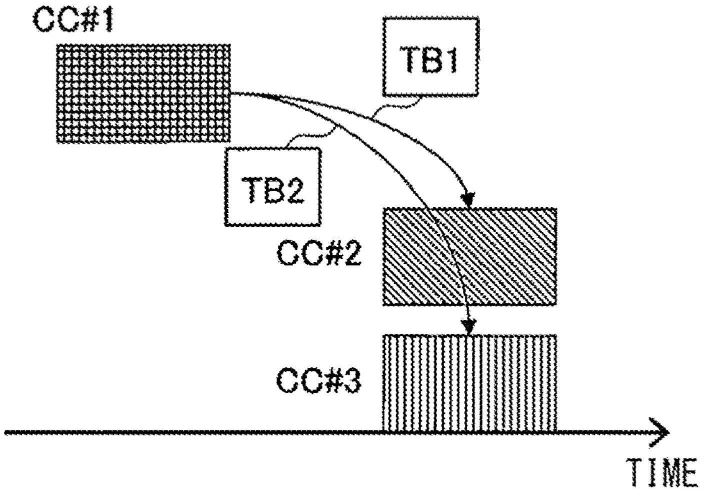
FIG. 5 is a diagram illustrating a scheduling example in the embodiment of the invention.

FIG. 5 is a diagram illustrating a scheduling example in the embodiment of the invention.

As illustrated in FIG. 5, in a case where the base station 10 schedules each PDSCH in CC #2 and CC #3 by a single PDCCH in CC #1 corresponding to the primary cell, the primary secondary cell, or the secondary cell, it is necessary to define how the transport block is mapped in CC, and it is also necessary to define the associated operation. It is assumed that TB1 and TB2 illustrated in FIG. 5 are the same transport block, different transport blocks, or a part of the transport block part (for example, a code block or a code block group). Hereinafter, the "transport block" will be also referred as "TB".

For example, in a case where TB1 and TB2 illustrated in FIG. 5 are the same transport block, it is necessary for the terminal 20 to determine whether soft combining is to be performed on the reception side. In addition, for example, in a case where TB1 and TB2 illustrated in FIG. 5 are different transport blocks, it is necessary that a modulation and coding scheme (MCS), a hybrid automatic repeat request process number (HPN), and a new data indicator (NDI), are to be indicated to the terminal 20, with respect to each of the transport blocks to be received or transmitted in different CCs. In addition, for example, in a case where TB1 and TB2 illustrated in FIG. 5 are parts of a transport block, it is necessary to determine how to divide the transport block, and to determine how to transmit each divided segment in the associated CC.

Therefore, a plurality of cells may be scheduled by a single DCI so that the transmission of the transport block is performed according to at least any one of the following three types (or schemes).

Type 1) Different transport blocks are transmitted in different cells according to a single PDCCH.

Type 2) The same transport block is transmitted in different cells according to a single PDCCH.

Type 3) Parts of a transport block are transmitted in different cells according to a single PDCCH.

For example, any one of the type 1, the type 2, and the type 3 may be supported. Alternatively, for example, any two types from among the type 1, the type 2, and the type 3 may be supported. In addition, which type is to be used may be configured by RRC, based on a capability indication from the terminal 20. In addition, which type is to be used may be dynamically indicated to the terminal 20, based on DCI.

In order to support at least any one of the three types described above, a format in which a non-fallback DCI format is enhanced or reused, may be used. The non-fallback DCI format, for example, is a DCI format 1_1 and DCI a format 0_1 in an NR system. The non-fallback DCI format, for example, is a DCI format having a size larger than that of a DCI format 1_0 and a DCI format 0_0 that are fallback DCI formats, and, unlike the fallback DCI format, has a size that is changed depending on the configuration.

For example, with respect to the different transport blocks of the type 1, MCS, NDI, and a redundancy version (RV) may be independently indicated to the terminal 20 through the non-fallback DCI. For example, an operation of transmitting two codewords to corresponding two scheduled cells, may be supported by using the contents and the structure of the DCI format 1_1 for scheduling two codewords. For example, in a case where a transport block 1 is transmitted in a certain cell of the scheduled cells, MCS may be configured to be 5 bits, NDI may be configured to be 1 bit, RV may be configured to be 2 bits, and the MCS, NDI, and RV may be included in the DCI format. Further, in a case where a transport block 2 is transmitted in a cell of the scheduled cells, different from the cell in which the transport block 1 is transmitted, MCS may be configured to be 5 bit, NDI may be configured to be 1 bit, RV may be configured to be 2 bits, and the MCS, NDI, and RV may be included in the DCI format. Note that, with respect to the transport block 2, only in a case where the value of an information element "maxNrofTransportBlockScheduledByOneDCI" is "2", scheduling of a plurality of transport blocks by using a single PDCCH, may be configured or activated. As described above, with respect to the transport block 1 and the transport block 2, parameters such as MCS, NDI, and RV may be individually configured.

Note that, in a case where different transport blocks are used, it may be interpreted that HPNs are same, and a single HPN field included in DCI for scheduling the plurality of cells, may be commonly used.

For example, with respect to different transport blocks of the type 1, the same MCS, NDI, and RV may be indicated to the terminal 20 through the non-fallback DCI. For example, up to two codewords may be supported depending on "maxNrofCodeWordsScheduledByDCI" that is configured for each cell, in each of the scheduled cells, by using the contents and the structure of the DCI format 1_1 for scheduling two codewords.

For example, the indication of MCS, NDI, or RV with respect to TB1 may be applied to a cell that supports only one codeword. In addition, for example, in a case where all of the scheduled cells support only one codeword, the field of MCS, NDI, and RV with respect to TB2 need not exist. In addition, HPNs with respect to different transport blocks may be the same.

Here, in the type 2 in which the same transport block is transmitted, the non-fallback DCI format may be used by configuring a repetition coefficient (a repetition factor) to be configured by RRC, and a repetition coefficient greater than 1 may be indicated to the terminal 20 by DCI. The same repetition coefficient may be applied to all of the plurality of scheduled cells. The repetition may be first applied to the frequency domain, and then to the time domain. Note that the repetition may be first applied to the time domain, and then to the frequency domain.

Figure 6:
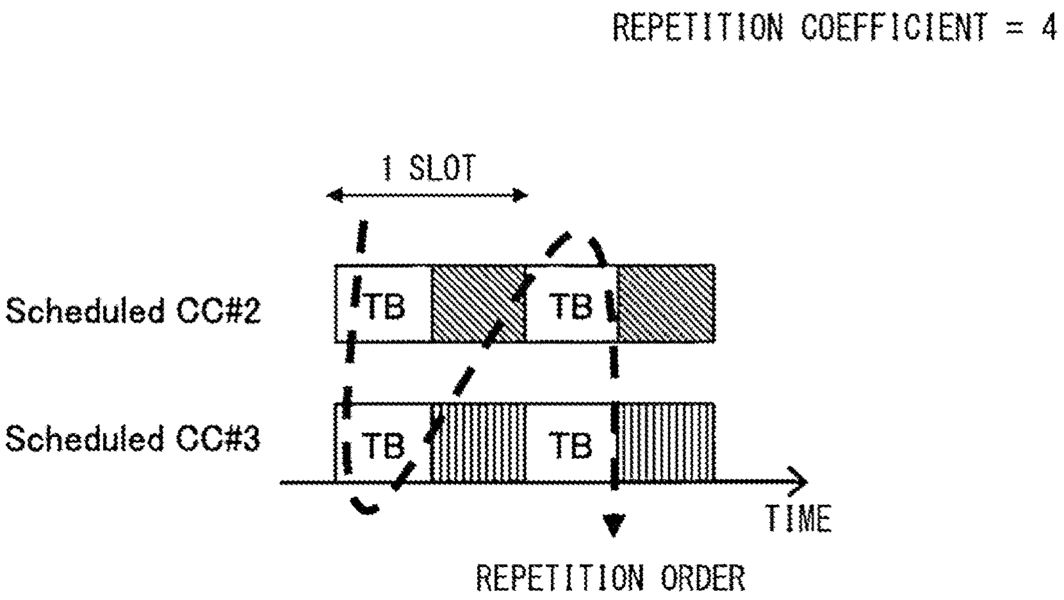
FIG. 6 is a diagram illustrating a transport block transmission and reception example (1) in the embodiment of the invention.

FIG. 6 is a diagram illustrating a transport block transmission and reception example (1) in the embodiment of the invention. An example in which the repetition coefficient of all of the plurality of scheduled cells is 4 is described by using FIG. 6. As illustrated in FIG. 6, the same transport block is transmitted twice by using each of a scheduled CC #2 and a scheduled CC #3. The repetition is first applied to the frequency domain and then to the time domain. The repetition order is: TB to be mapped in a resource of a first slot of CC #2; TB to be mapped in a resource of a first slot of CC #3; TB to be mapped in a resource of a second slot of CC #2; and TB to be mapped in a resource of a second slot of CC #3, as illustrated in FIG. 6.

Figure 7:
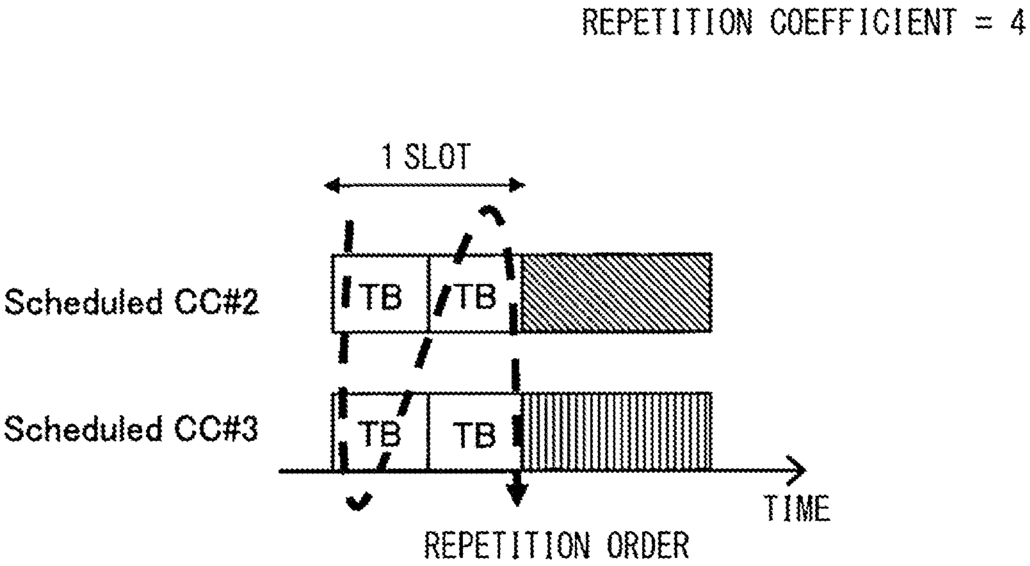
FIG. 7 is a diagram illustrating a transport block transmission and reception example (2) in the embodiment of the invention.

FIG. 7 is a diagram illustrating a transport block transmission and reception example (2) in the embodiment of the invention. An example in which the repetition coefficient of all of the plurality of scheduled cells is 4 is described by using FIG. 7. As illustrated in FIG. 7, the same transport block is transmitted twice by each of the scheduled CC #2 and the scheduled CC #3. The repetition is first applied to the frequency domain and then to the time domain. The repetition order is: TB to be mapped in the first half resource of the first slot of CC #2; TB to be mapped in the first half resource of the first slot of CC #3; TB to be mapped in the second half resource of the first slot of CC #2; and TB to be mapped in the second half resource of the first slot of CC #3, as illustrated in FIG. 7.

Here, in the type 2 in which the same transport block is transmitted, the non-fallback DCI format may be used by configuring the repetition coefficient that is configured by RRC without any limitation, and the repetition coefficient may be indicated to the terminal 20 by DCI. The same repetition coefficient may be applied to each of the plurality of scheduled cells.

Figure 8:
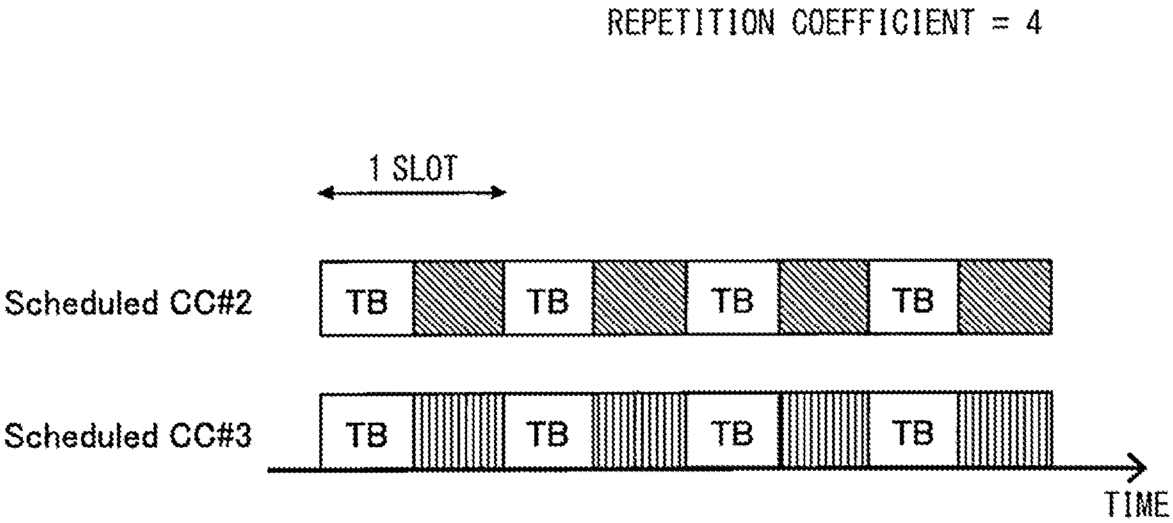
FIG. 8 is a diagram illustrating a transport block transmission and reception example (3) in the embodiment of the invention.

FIG. 8 is a diagram illustrating a transport block transmission and reception example (3) in the embodiment of the invention. An example in which the repetition coefficient in each of the plurality of scheduled cells is 4 is described by using FIG. 8. As illustrated in FIG. 8, the same transport block is transmitted four times by each of the scheduled CC #2 and the scheduled CC #3. That is, as illustrated in FIG. 8, TB is transmitted in a first slot, a second slot, a third slot, and a fourth slot of CC #2, and TB is transmitted in a first slot, a second slot, a third slot, and a fourth slot of CC #3.

Figure 9:
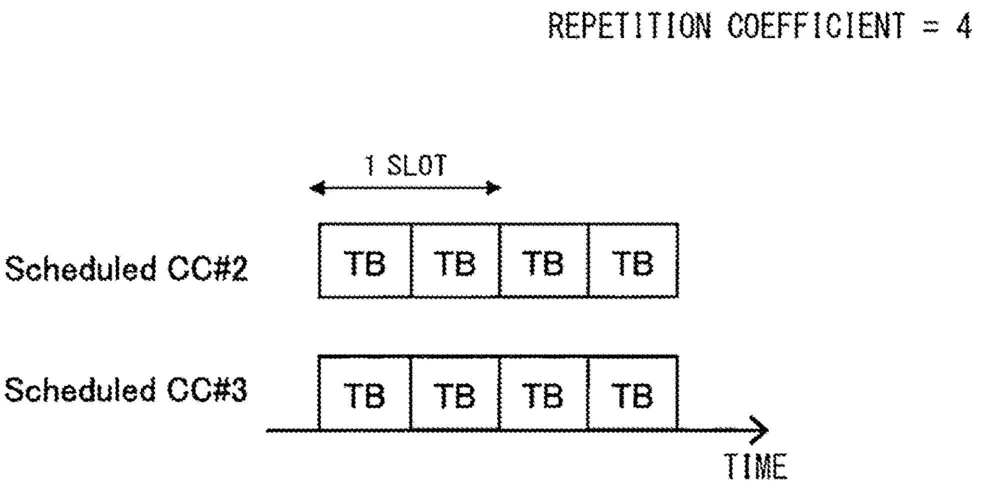
FIG. 9 is a diagram illustrating a transport block transmission and reception example (4) in the embodiment of the invention.

FIG. 9 is a diagram illustrating a transport block transmission and reception example (4) in the embodiment of the invention. An example in which the repetition coefficient in each of the plurality of scheduled cells is 4 is described by using FIG. 9. As illustrated in FIG. 9, the same transport block is transmitted four times by each of the scheduled CC #2 and the scheduled CC #3. That is, as illustrated in FIG. 9, TB is transmitted in the first half resource of the first slot, the second half resource of the first slot, the first half resource of the second slot, and the second half resource of the second slot of CC #2, and TB is transmitted in the first half resource of the first slot, the second half resource of the first slot, the first half resource of the second slot, and the second half resource of the second slot of CC #3.

Note that, the terminal 20 may switch between: a method for applying the repetition coefficient to all of the plurality of cells illustrated in FIG. 6 and FIG. 7; and a method for applying the repetition coefficient to each of the plurality of cells illustrated in FIG. 8 and FIG. 9.

Here, in the type 3 in which parts of the transport block are transmitted, scheduling for assembling the resources of the frequency domains of the plurality of scheduled cells, may be available by the non-fallback DCI format. For example, resource allocation $N_{RB}^{DLBWP}$ of the frequency domain of the transport block may be the total size of active DL BWPs of the plurality of cells.

Figure 10:
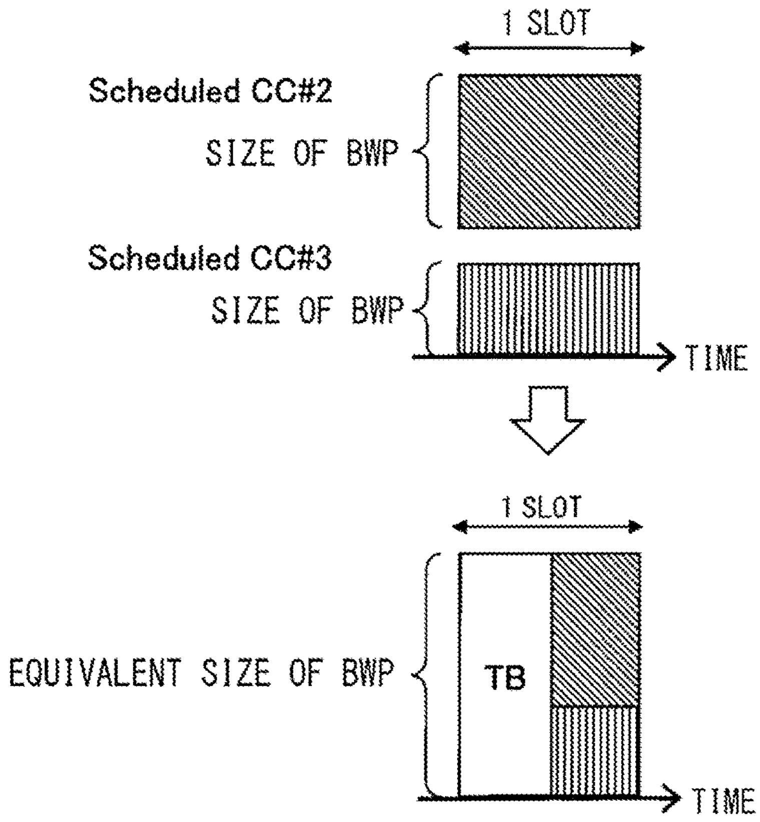
FIG. 10 is a diagram illustrating a transport block transmission and reception example (5) in the embodiment of the invention.

FIG. 10 is a diagram illustrating a transport block transmission and reception example (5) in the embodiment of the invention. As illustrated in FIG. 10, an equivalent size of BWP, which is a total size of the size of BWP of the scheduled CC #2 and the size of BWP of the scheduled CC #3, may be used in resource mapping of the transport block to be transmitted.

In addition, in the type 3 in which a part of the transport block is transmitted, scheduling using code block group (CBG) notification may be available by the non-fallback DCI format. The number of CBGs indicated by the value of CBG transmission information (CBGTI), may be averaged among the plurality of scheduled cells, and a same number may be mapped in each of the cells, or the number of CBGs indicated by the value of CBGTI, may be mapped in each of the scheduled cells.

Figure 11:
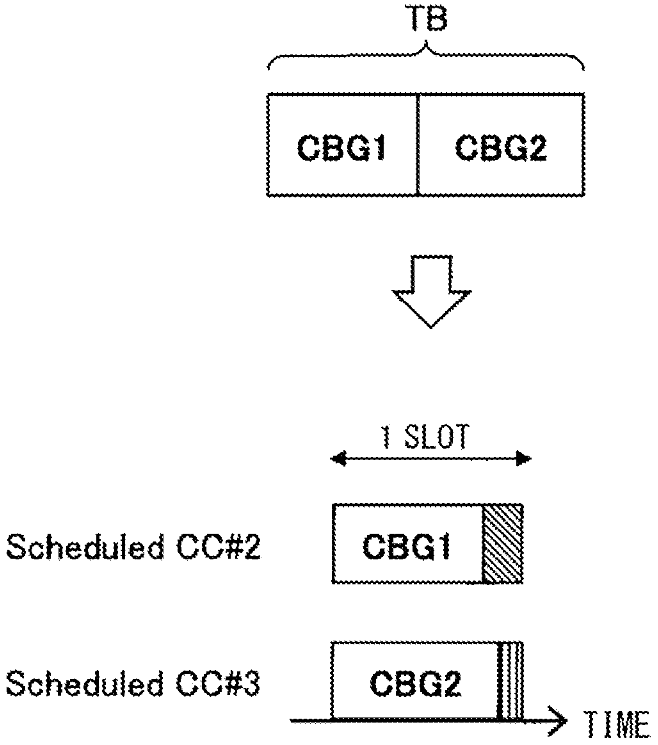
FIG. 11 is a diagram illustrating a transport block transmission and reception example (6) in the embodiment of the invention.

FIG. 11 is a diagram illustrating a transport block transmission and reception example (6) in the embodiment of the invention. An example in which a value obtained by averaging the value of CBGTI among the plurality of scheduled cells is applied to each of the cells in the case of CBGTI=2 is described by using FIG. 11. In a case where the CBGTI is averaged between two cells, the value is 1, and thus, one CBG is transmitted in each of the cells, and the transport block is composed of two CBGs. Therefore, as illustrated in FIG. 11, CBG1 is transmitted in the scheduled CC #2, and CBG2 is transmitted in the scheduled CC #3. Note that, CBG described above may be a code block (CB).

Figure 12:
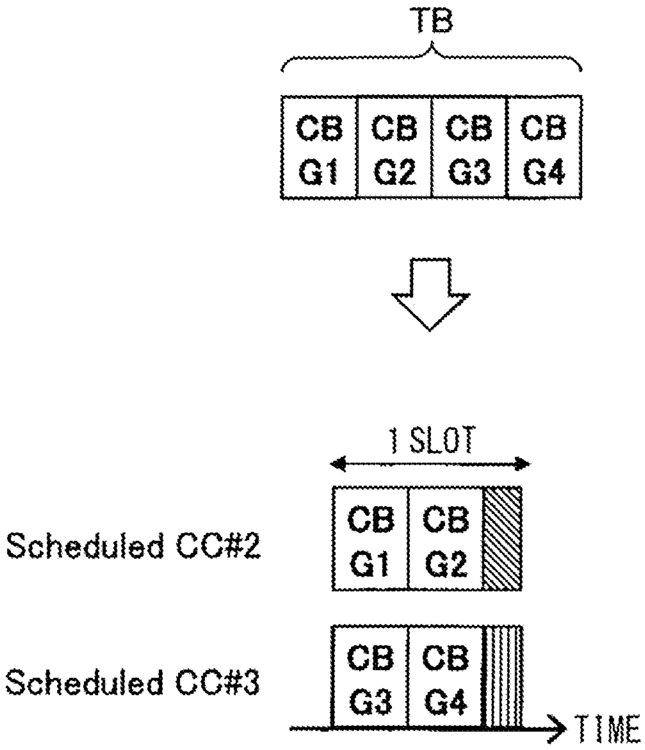
FIG. 12 is a diagram illustrating a transport block transmission and reception example (7) in the embodiment of the invention.

FIG. 12 is a diagram illustrating a transport block transmission and reception example (7) in the embodiment of the invention. An example in which the same value of CBGTI in the plurality of scheduled cells is applied to each of the cells in the case of CBGTI=2 is described by using FIG. 12. Two CBGs are transmitted in each of the cells according to CBGTI=2, and thus, the transport block is composed of four CBGs. Therefore, as illustrated in FIG. 12, CBG1 and CBG2 are transmitted in the scheduled CC #2, and CBG3 and CBG4 are transmitted in the scheduled CC #3. Note that, CBG described above may be CB.

Note that, the terminal 20 may switch between: a method of applying a value obtained by averaging the values of CBGTI in the plurality of cells illustrated in FIG. 11 to each of the cells; and a method of applying the same value of CBGTI in the plurality of cells illustrated in FIG. 12 to each of the cells.

Note that, a UE capability of supporting any one or two of UE capabilities and the corresponding signaling may be defined separately from a UE capability of supporting the scheduling of the plurality of cells by using the single DCI and the corresponding signaling, the UE capabilities being: a UE capability of receiving the type 1 described above in which different transport blocks are transmitted in different cells by using a single PDCCH; a UE capability of receiving the type 2 described above in which the same transport block is transmitted in different cells by using a single PDCCH described above; and a UE capability of receiving the type 3 described above in which parts of a transport block is transmitted in different cells by using a single PDCCH. Alternatively, any one, two, or three of the UE capabilities may be defined as a part of the UE capability of supporting the scheduling of the plurality of cells by using a single DCI.

That is, the UE capability of supporting the scheduling of the plurality of cells by using a single DCI may include a capability indicating a supported scheme of transmitting a scheduled transport block.

By the example described above, in a case where the plurality of cells are scheduled by a single DCI, the terminal 20 can perform configuration for receiving different transport blocks, the same transport block, or a part of the transport block in each of the cells. In addition, in a case where the plurality of cells are scheduled by using a single DCI, the terminal 20 can configure parameters necessary for receiving the transport block in each of the cells. In addition, in a case where repetition transmission is configured, the terminal 20 can receive the transport block in each of the scheduled cells. In addition, in a case where parts of a transport block are received, the terminal 20 can receive the transport block with the size that is a total size of the BWP size of each of the cells. In addition, the terminal 20 can receive the transport block by receiving CBG in each of the cells, based on CBGTI.

That is, it is possible for the terminal to correctly receive a transport block from a plurality of cells, in the radio communication system.

(Function Configuration)

Next, a function configuration example of the base station 10 and the terminal 20 executing the processing and the operation that have been described will be described. The base station 10 and the terminal 20 have functions for implementing the example described above. Here, each of the base station 10 and the terminal 20 may have only a part of the functions in the example.

<Base Station 10>

Figure 13:
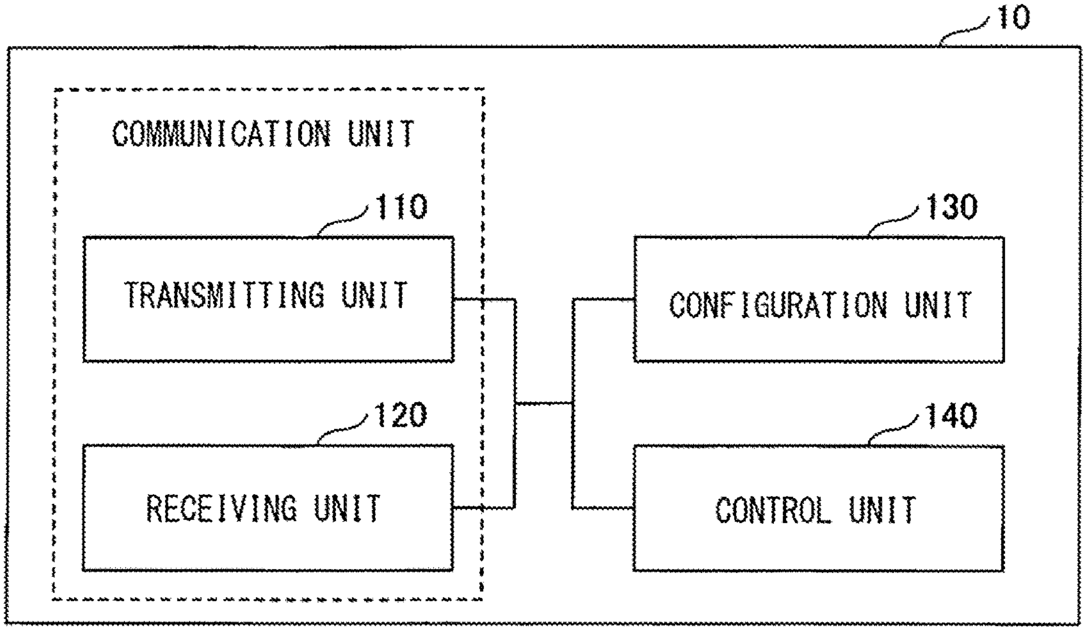
FIG. 13 is a diagram illustrating an example of a function configuration of a base station 10 in the embodiment of the invention.

FIG. 13 is a diagram illustrating an example of a function configuration of the base station 10 in the embodiment of the invention. As illustrated in FIG. 13, the base station 10 includes a transmitting unit 110, a receiving unit 120, a configuration unit 130, and a control unit 140. The function configuration illustrated in FIG. 13 is merely an example. Any names may be used for functional segments and functional parts, insofar as the operation according to the embodiment of the invention can be executed.

The transmitting unit 110 has a function of generating a signal that is transmitted to the terminal 20 side and of transmitting the signal over the radio. In addition, the transmitting unit 110 transmits a message between network nodes to the other network node. The receiving unit 120 has a function of receiving various signals transmitted from the terminal 20 and of acquiring, for example, information of a higher layer from the received signals. In addition, the transmitting unit 110 has a function of transmitting NR-PSS, NR-SSS, NR-PBCH, a DL/UL control signal, or the like to the terminal 20. In addition, the receiving unit 120 receives the message between the network nodes from the other network node. The transmitting unit 110 and the receiving unit 120 may be combined as a communication unit.

The configuration unit 130 stores configuration information that is configured in advance, and various configuration information items that are transmitted to the terminal 20 in a storage unit, and as necessary, reads out the information from the storage unit. The contents of the configuration information, for example, are information necessary for a DSS technology and the scheduling of the single cell or the plurality of cells.

As described in the example, the control unit 140 performs control according to the DSS technology. In addition, the control unit 140 performs control according to the scheduling of the single cell or the plurality of cells. A functional part relevant to signal transmission in the control unit 140 may be included in the transmitting unit 110, and a functional part relevant to signal reception in the control unit 140 may be included in the receiving unit 120.

<Terminal 20>

Figure 14:
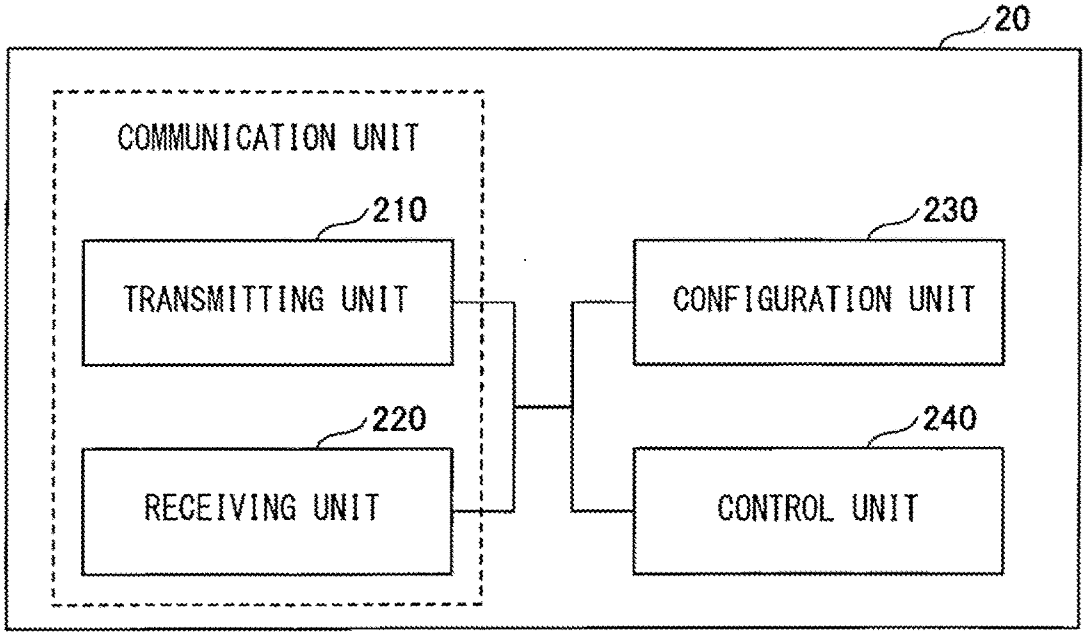
FIG. 14 is a diagram illustrating an example of a function configuration of a terminal 20 in the embodiment of the invention.

FIG. 14 is a diagram illustrating an example of a function configuration of the terminal 20 in the embodiment of the invention. As illustrated in FIG. 14, the terminal 20 includes a transmitting unit 210, a receiving unit 220, a configuration unit 230, and a control unit 240. The function configuration illustrated in FIG. 14 is merely an example. Any names may be used for functional segments and functional parts, insofar as the operation according to the embodiment of the invention can be executed.

The transmitting unit 210 has a function of preparing a transmission signal from transmission data and of transmitting the transmission signal over the radio. The receiving unit 220 receives various signals over the radio and acquires a signal of a higher layer from the received signal of a physical layer. In addition, the receiving unit 220 has a function of receiving NR-PSS, NR-SSS, NR-PBCH, a DL/UL/SL control signal, and the like, which are transmitted from the base station 10. In addition, for example, the transmitting unit 210 transmits a physical sidelink control channel (PSCCH), a physical sidelink shared channel (PSSCH), a physical sidelink discovery channel (PSDCH), a physical sidelink broadcast channel (PSBCH), and the like to the other terminal 20, as D2D communication, and the receiving unit 220 receives PSCCH, PSSCH, PSDCH, PSBCH, or the like from the other terminal 20. The transmitting unit 210 and the receiving unit 220 may be combined as a communication unit.

The configuration unit 230 stores various configuration information items received from the base station 10 or the terminal 20 by the receiving unit 220 in a storage unit, and as necessary, reads out the information from the storage unit. In addition, the configuration unit 230 also stores configuration information that is configured in advance. The contents of the configuration information, for example, are the information necessary for the DSS technology and the cross-carrier scheduling, or the like.

As described in the example, the control unit 240 performs the control according to the DSS technology in the terminal 20. In addition, the control unit 240 performs the control according to the scheduling of the single cell or the plurality of cells. In addition, the control unit 240 performs control according to the reception of the transport block. A functional part relevant to signal transmission in the control unit 240 may be included in the transmitting unit 210, and a functional part relevant to signal reception in the control unit 240 may be included in the receiving unit 220.

(Hardware Configuration)

The block diagrams (FIG. 13 and FIG. 14) used in the description of the embodiment described above illustrate the block of functional unit. Such function blocks (configuration parts) are attained by at least one arbitrary combination of hardware and software. In addition, an attainment method of each of the function blocks is not particularly limited. That is, each of the function blocks may be attained by using one apparatus that is physically or logically coupled, by connecting two or more apparatuses physically or logically separated directly or indirectly (for example, in a wired manner, over the radio, or the like) and by using such a plurality of apparatuses. The function block may be attained by combining the one apparatus described above or the plurality of apparatuses described above with software.

The function includes determining, deciding, judging, calculating, computing, processing, deriving, investigating, looking up, ascertaining, receiving, transmitting, output, accessing, resolving, selecting, choosing, establishing, comparing, assuming, expecting, presuming, broadcasting, notifying, communicating, forwarding, configuring, reconfiguring, allocating (mapping), assigning, and the like, but is not limited thereto. For example, a function block (a configuration part) that functions transmission is referred to as the transmitting unit or a transmitter. As described above, the attainment method thereof is not particularly limited.

Figure 15:
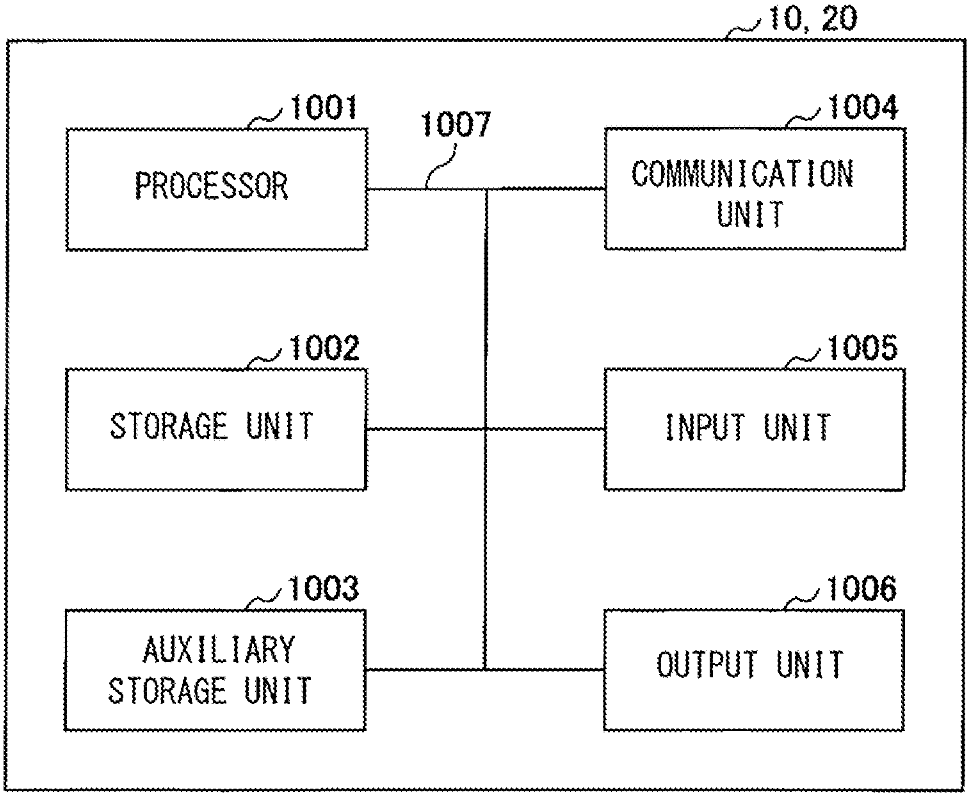
FIG. 15 is a diagram illustrating an example of a hardware configuration of the base station 10 or the terminal 20 in the embodiment of the invention.

For example, the base station 10, the terminal 20, and the like in one embodiment of this disclosure may function as a computer for performing the processing of a radio communication method of this disclosure. FIG. 15 is a diagram illustrating an example of a hardware configuration of the base station 10 and the terminal 20 according to one embodiment of this disclosure. The base station 10 and the terminal 20 described above may be physically configured as a computer apparatus including a processor 1001, a storage unit 1002, an auxiliary storage unit 1003, a communication unit 1004, an input unit 1005, an output unit 1006, a bus 1007, and the like.

Note that, in the following description, the word "apparatus" can be replaced with a circuit, a device, a unit, or the like. The hardware configuration of the base station 10 and the terminal 20 may be configured to include one or a plurality of apparatuses illustrated in the drawings, or may be configured not to include a part of the apparatuses.

Each function of the base station 10 and the terminal 20 is attained by reading predetermined software (a program) on hardware such as the processor 1001 and the storage unit 1002 such that the processor 1001 performs an operation, and by controlling the communication of the communication unit 1004 or by controlling at least one of reading and writing of data in the storage unit 1002 and the auxiliary storage unit 1003.

The processor 1001, for example, controls the entire computer by operating an operating system. The processor 1001 may be configured by a central processing unit (CPU) including an interface with respect to the peripheral equipment, a control apparatus, an operation apparatus, a register, and the like. For example, the control unit 140, the control unit 240, or the like, described above, may be attained by the processor 1001.

In addition, the processor 1001 reads out a program (a program code), a software module, data, and the like to the storage unit 1002 from at least one of the auxiliary storage unit 1003 and the communication unit 1004, and thus, executes various processings. A program for allowing a computer to execute at least a part of the operation described in the embodiment described above is used as the program. For example, the control unit 140 of the base station 10 illustrated in FIG. 13 may be attained by a control program that is stored in the storage unit 1002 and is operated by the processor 1001. In addition, for example, the control unit 240 of the terminal 20 illustrated in FIG. 14 may be attained by a control program that is stored in the storage unit 1002 and is operated by the processor 1001. It has been described that the various processings described above are executed by one processor 1001, but the processings may be simultaneously or sequentially executed by two or more processors 1001. The processor 1001 may be mounted on one or more chips. Note that, the program may be transmitted from a network through an electric communication line.

The storage unit 1002 is a computer readable recording medium, and for example, may be configured of at least one of a read only memory (ROM), an erasable programmable ROM (EPROM), an electrically erasable programmable ROM (EEPROM), a random access memory (RAM), and the like. The storage unit 1002 may be referred to as a register, a cache, a main memory (a main storage unit), and the like. The storage unit 1002 is capable of retaining a program (a program code), a software module, and the like, which can be executed in order to implement a communication method according to one embodiment of this disclosure.

The auxiliary storage unit 1003 is a computer readable recording medium, and for example, may be configured of at least one of an optical disk such as a compact disc ROM (CD-ROM), a hard disk drive, a flexible disk, a magnetooptical disk (for example, a compact disc, a digital versatile disk, and a Blu-ray (Registered Trademark) disk), a smart card, a flash memory (for example, a card, a stick, a key drive), a floppy (Registered Trademark) disk, a magnetic strip, and the like. The recording medium described above, for example, may be a database including at least one of the storage unit 1002 and the auxiliary storage unit 1003, a server, and other suitable media.

The communication unit 1004 is hardware for performing communication with respect to the computer through at least one of a wire network and a radio network (a transmitting and receiving device), and for example, is also referred to as a network device, a network controller, a network card, a communication module, and the like. The communication unit 1004, for example, may be configured by including a high frequency switch, a duplexer, a filter, a frequency synthesizer, and the like, in order to attain at least one of frequency division duplex (FDD) and time division duplex (TDD). For example, a transmitting and receiving antenna, an amplifier, a transmitting and receiving unit, a transmission path interface, and the like may be attained by the communication unit 1004. In the transmitting and receiving unit, the transmitting unit and the receiving unit may be mounted by being physically or logically separated.

The input unit 1005 is an input device for receiving input from the outside (for example, a keyboard, a mouse, a microphone, a switch, a button, a sensor, and the like). The output unit 1006 is an output device for implementing output with respect to the outside (for example, a display, a speaker, an LED lamp, and the like). Note that, the input unit 1005 and the output unit 1006 may be integrally configured (for example, a touch panel).

In addition, each of the apparatuses such as the processor 1001 and the storage unit 1002 may be connected by the bus 1007 for performing communication with respect to information. The bus 1007 may be configured by using a single bus, or may be configured by using buses different for each of the apparatuses.

In addition, the base station 10 and the terminal 20 may be configured by including hardware such as a microprocessor, a digital signal processor (DSP), an application specific integrated circuit (ASIC), a programmable logic device (PLD), and a field programmable gate array (FPGA), and a part or all of the respective function blocks may be attained by the hardware. For example, the processor 1001 may be mounted by using at least one of the hardware elements.

Summary of Embodiment

As described above, according to the embodiment of the invention, a terminal including: a receiving unit receiving single control information for scheduling a plurality of cells; and a control unit receiving a transport block from the plurality of cells, based on the control information, in which the control unit: receives a different transport block in each of the plurality of cells; receives a same transport block in each of the plurality of cells; or receives a part of a transport block in each of the plurality of cells, is provided.

By the configuration described above, in a case where the plurality of cells are scheduled, the terminal 20 can perform configuration for receiving a different transport block, a same transport block, or a part of the transport block in each of the cells. That is, it is possible for the terminal to correctly receive the transport block from the plurality of cells, in the radio communication system.

In a case where a different transport block is received in each of the plurality of cells, the control unit may receive the transport block in each of the plurality of cells by using different parameters in each of the plurality of cells. By the configuration described above, in a case where the plurality of cells are scheduled, the terminal 20 can configure the parameters necessary for receiving the transport block in each of the cells.

In a case where a different transport block in each of the plurality of cells is received, the control unit may assume that hybrid automatic repeat request (HARQ) process numbers are same between the transport blocks. By the configuration described above, in a case where the plurality of cells are scheduled, the terminal 20 configure the parameters necessary for receiving the transport block in each of the cells.

In a case where a same transport block in each of the plurality of cells is received, the control unit may apply a repetition coefficient in all of the plurality of cells or may apply a repetition coefficient in each of the plurality of cells. By the configuration described above, in a case where the repetition transmission is configured, the terminal 20 can receive the transport block in each of the scheduled cells.

In a case where a part of the transport block in each of the plurality of cells is received, the control unit may apply a value obtained by averaging code block group transmission information (CBGTI) values in the plurality of cells, to each of the cells or may apply the same CBGTI value in each of the plurality of cells. By the configuration described above, the terminal 20 can receive the transport block by receiving CBG in each of the cells, based on CBGTI.

In addition, according to the embodiment of the invention, a communication method by which a terminal executes: a receiving step of receiving single control information for scheduling a plurality of cells; and a control step of receiving a transport block from the plurality of cells, based on the control information, in which the control step: receives a different transport block in each of the plurality of cells; receives a same transport block in each of the plurality of cells; or receives a part of a transport block in each of the plurality of cells, is provided.

By the configuration described above, in a case where the plurality of cells are scheduled, the terminal 20 can perform configuration for receiving a different transport block, a same transport block, or a part of the transport block in each of the cells. That is, it is possible for the terminal to correctly receive the transport block from the plurality of cells, in the radio communication system.

Supplement to Embodiment

As described above, the embodiment of the invention has been described, but the disclosed invention is not limited to the embodiment, and a person skilled in the art will understand various modification examples, correction examples, alternative examples, substitution examples, and the like. Specific numerical examples have been described in order to facilitate the understanding of the invention, but the numerical values are merely an example, and any appropriate values may be used, unless otherwise specified. The classification of the items in the above description is not essential to the invention, and the listings described in two or more items may be used by being combined, as necessary, or the listing described in one item may be applied to the listing described in another item (insofar as there is no contradiction). A boundary between the functional parts or the processing parts in the function block diagram does not necessarily correspond to a boundary between physical components. The operations of a plurality of functional parts may be physically performed by one component, or the operation of one functional part may be physically performed by a plurality of components. In a processing procedure described in the embodiment, a processing order may be changed, insofar as there is no contradiction. For the convenience of describing the processing, the base station 10 and the terminal 20 have been described by using a functional block diagram, but such an apparatus may be attained by hardware, software, or a combination thereof. Each of software that is operated by a processor of the base station 10 according to the embodiment of the invention and software that is operated by a processor of the terminal 20 according to the embodiment of the invention may be retained in a random access memory (RAM), a flash memory, a read only memory (ROM), an EPROM, an EEPROM, a register, a hard disk (HDD), a removable disk, a CD-ROM, a database, a server, and other suitable storage media.

In addition, the notification of the information is not limited to the aspect/embodiment described in this disclosure, and may be performed by using other methods. For example, the notification of the information may be implemented by physical layer signaling (for example, downlink control information (DCI) and uplink control information (UCI)), higher layer signaling (for example, radio resource control (RRC) signaling, medium access control (MAC) signaling, broadcast information (a master information block (MIB)), a system information block (SIB)), other signals, or a combination thereof. In addition, the RRC signaling may be referred to as an RRC message, and for example, may be an RRC connection setup message, an RRC connection reconfiguration message, and the like.

Each aspect/embodiments described in this disclosure may be applied to a system using long term evolution (LTE), LTE-advanced (LTE-A), SUPER 3G, IMT-advanced, a 4th generation mobile communication system (4G), a 5th generation mobile communication system (5G), future radio access (FRA), new radio (NR), W-CDMA (Registered Trademark), GSM (Registered Trademark), CDMA2000, an ultra mobile broadband (UMB), IEEE 802.11 (Wi-Fi (Registered Trademark)), IEEE 802.16 (WiMAX (Registered Trademark)), IEEE 802.20, an ultra-wideband (UWB), Bluetooth (Registered Trademark), and other suitable systems and a next-generation system that is expanded on the basis thereof. In addition, a combination of a plurality of systems (for example, a combination of at least one of LTE and LTE-A and 5G, and the like) may be applied.

In the processing procedure, the sequence, the flowchart, and the like of each aspect/embodiment described herein, the order may be changed, insofar as there is no contradiction. For example, in the method described in this disclosure, the elements of various steps are presented by using an exemplary order, but are not limited to the presented specific order.

Herein, a specific operation that is performed by the base station 10 may be performed by an upper node, in accordance with a case. In a network provided with one or a plurality of network nodes including the base station 10, it is obvious that various operations that are performed in order for communication with respect to the terminal 20 can be performed by at least one of the base station 10 and network nodes other than the base station 10 (for example, MME, S-GW, or the like is considered as the network node, but the network node is not limited thereto). In the above description, a case is exemplified in which the number of network nodes other than the base station 10 is 1, but a plurality of other network nodes may be combined (for example, the MME and the S-GW).

The information, the signal, or the like described in this disclosure can be output to a lower layer (or the higher layer) from the higher layer (or the lower layer). The information, the signal, or the like may be input and output through a plurality of network nodes.

The input and output information or the like may be retained in a specific location (for example, a memory), or may be managed by using a management table. The information or the like that is input and output can be subjected to overwriting, updating, or editing. The output information or the like may be deleted. The input information or the like may be transmitted to the other apparatuses.

Judgment in this disclosure may be performed by a value represented by 1 bit (0 or 1), may be performed by a truth-value (Boolean: true or false), or may be performed by a numerical comparison (for example, a comparison with a predetermined value).

Regardless of whether the software is referred to as software, firmware, middleware, a microcode, and a hardware description language, or is referred to as other names, the software should be broadly interpreted to indicate a command, a command set, a code, a code segment, a program code, a program, a sub-program, a software module, an application, a software application, a software package, a routine, a sub-routine, an object, an executable file, an execution thread, a procedure, a function, and the like.

In addition, software, a command, information, and the like may be transmitted and received through a transmission medium. For example, in a case where the software is transmitted from a website, a server, or other remote sources by using at least one of a wire technology (a coaxial cable, an optical fiber cable, a twisted pair, a digital subscriber line (DSL), and the like) and a radio technology (an infrared ray, a microwave, and the like), at least one of the wire technology and the radio technology is included in the definition of the transmission medium.

The information, the signal, and the like described in this disclosure may be represented by using any of various different technologies. For example, the data, the command, the command, the information, the signal, the bit, the symbol, the chip, and the like that can be referred to through the entire description described above may be represented by a voltage, a current, an electromagnetic wave, a magnetic field or magnetic particles, an optical field or a photon, or an arbitrary combination thereof.

Note that, the terms described in this disclosure and the terms necessary for understanding this disclosure may be replaced with terms having the same or similar meaning. For example, at least one of the channel and the symbol may be a signal (signaling). In addition, the signal may be a message. In addition, a component carrier (CC) may be referred to as a carrier frequency, a cell, a frequency carrier, and the like.

The terms "system" and "network" used in this disclosure are interchangeably used.

In addition, the information, the parameter, and the like described in this disclosure may be represented by using an absolute value, may be represented by using a relative value from a predetermined value, or may be represented by using another corresponding information. For example, a radio resource may be indicated by an index.

The names used in the parameters described above are not a limited name in any respect. Further, expressions or the like using such parameters may be different from those explicitly disclosed in this disclosure. Various channels (for example, PUCCH, PDCCH, and the like) and information elements can be identified by any suitable name, and thus, various names that are allocated to such various channels and information elements are not a limited name in any respect.

In this disclosure, the terms "base station (BS)", "radio base station", "base station apparatus", "fixed station", "NodeB", "eNodeB (eNB)", "gNodeB (gNB)", "access point", "transmission point", "reception point", "transmission and reception point (transmission/reception point)", "cell", "sector", "cell group", "carrier", "component carrier", and the like can be interchangeably used. The base station may be referred to as a term such as a macrocell, a small cell, a femtocell, and a picocell.

The base station is capable of accommodating one or a plurality of (for example, three) cells. In a case where the base station accommodates the plurality of cells, the entire coverage area of the base station can be classified into a plurality of small areas, and each of the small areas is capable of providing a communication service by a base station subsystem (for example, an indoor type small base station (a remote radio head (RRH)). The term "cell" or "sector" indicates a part of the coverage area or the entire coverage area of at least one of the base station and the base station subsystem that perform the communication service in the coverage.

In this disclosure, the terms "mobile station (MS)", "user terminal", "user equipment (UE)", and "terminal" can be interchangeably used.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable terms, by a person skilled in the art.

At least one of the base station and the mobile station may be referred to as a transmitting apparatus, a receiving apparatus, a communication unit, and the like. Note that, at least one of the base station and the mobile station may be a device that is mounted on a mobile object, the mobile object itself, or the like. The mobile object may be a vehicle (for example, a car, an airplane, and the like), may be a mobile object that is moved in an unmanned state (for example, a drone, an autonomous driving car, and the like), or may be a (manned or unmanned) robot. Note that, at least one of the base station and the mobile station also includes an apparatus that is not necessarily moved in a communication operation. For example, at least one of the base station and the mobile station may be an internet of things (IoT) device such as a sensor.

In addition, the base station in this disclosure may be replaced with the user terminal. For example, each aspect/embodiment of this disclosure may be applied to a configuration in which communication between the base station and the user terminal is replaced with communication in a plurality of terminals 20 (for example, may be referred to as device-to-device (D2D), vehicle-to-everything (V2X), and the like). In this case, the function of the base station 10 described above may be provided in the terminal 20. In addition, the words "up", "down", and the like may be replaced with words corresponding to the communication between the terminals (for example, "side"). For example, an up channel, a down channel, and the like may be replaced with a side channel.

Similarly, the user terminal in this disclosure may be replaced with the base station. In this case, the function of the user terminal described above may be provided in the base station.

The terms "determining" and "deciding (determining)" used in this disclosure may involve diverse operations. "Determining" and "deciding", for example, are capable of including "determining" and "deciding" with respect to judging, calculating, computing, processing, deriving, investigating, looking up (search, inquiry) (for example, looking up in a table, a database, or another data structure), and ascertaining, and the like. In addition, "determining" and "deciding" are capable of including "determining" and "deciding" with respect to receiving (for example, receiving information), transmitting (for example, transmitting information), input, output, and accessing (for example, accessing data in a memory), and the like. In addition, "determining" and "deciding" are capable of including "determining" and "deciding" with respect to resolving, selecting, choosing, establishing, comparing, and the like. That is, "determining" and "deciding" are capable of including "determining" and "deciding" with respect to any operation. In addition, "determining (deciding)" may be replaced with "assuming", "expecting", "considering", and the like.

The terms "connected" and "coupled", or any modification thereof indicate any direct or indirect connection or couple in two or more elements, and are capable of including a case where there are one or more intermediate elements between two elements that are "connected" or "coupled" to each other. The couple or connection between the elements may be physical couple or connection, may be logical couple or connection, or may be a combination thereof. For example, the "connection" may be replaced with "access". In the case of being used in this disclosure, it is possible to consider that two elements are "connected" or "coupled" to each other by using at least one of one or more electric wires, cables, and print electric connection, and as some non-limiting and non-inclusive examples, by using electromagnetic energy having a wavelength of a radio frequency domain, a microwave domain, and an optical (visible and invisible) domain, and the like.

The reference signal can also be abbreviated as RS, and may be referred to as pilot based on a standard to be applied.

The description "based on" that is used in this disclosure does not indicate "only based on", unless otherwise specified. In other words, the description "based on" indicates both "only based on" and "at least based on".

Any reference to elements using the designations "first," "second," and the like, used in this disclosure does not generally limit the amount or the order of such elements. Such designations can be used in this disclosure as a convenient method for discriminating two or more elements. Therefore, a reference to a first element and a second element does not indicate that only two elements can be adopted or the first element necessarily precedes the second element in any manner.

"Means" in the configuration of each of the apparatuses described above may be replaced with "unit", "circuit", "device", and the like.

In this disclosure, in a case where "include", "including", and the modification thereof are used, such terms are intended to be inclusive, as with the term "comprising". Further, the term "or" that is used in this disclosure is not intended to be exclusive-OR.

A radio frame may be configured of one or a plurality of frames in a time domain. Each of one or a plurality of frames in the time domain may be referred to as a subframe. The subframe may be further configured of one or a plurality of slots in the time domain. The subframe may be a fixed time length (for example, 1 ms) that does not depend on numerology.

The numerology may be a communication parameter to be applied to at least one of the transmission and the reception of a certain signal or channel. The numerology, for example, may indicate at least one of subcarrier spacing (SCS), a bandwidth, a symbol length, a cyclic prefix length, a transmission time interval (TTI), the number of symbols per TTI, a radio frame configuration, specific filtering processing that is performed by the transceiver in a frequency domain, specific windowing processing that is performed by the transceiver in a time domain, and the like.

The slot may be configured of one or a plurality of symbols (an orthogonal frequency division multiplexing (OFDM) symbol, a single carrier frequency division multiple access (SC-FDMA) symbol, and the like) in a time domain. The slot may be time unit based on the numerology.

The slot may include a plurality of mini slots. Each of the mini slots may be configured of one or a plurality of symbols in the time domain. In addition, the mini slot may be referred to as a subslot. The mini slot may be configured of symbols of which the number is less than that of the slot. PDSCH (or PUSCH) to be transmitted in time unit greater than the mini slot may be referred to as a PDSCH (or PUSCH) mapping type A. PDSCH (or PUSCH) to be transmitted by using the mini slot may be referred to as a PDSCH (or PUSCH) mapping type B.

All of the radio frame, the subframe, the slot, the mini slot, and the symbol represent time unit at the time of transmitting a signal. Other designations respectively corresponding to the radio frame, the subframe, the slot, the mini slot, and the symbol may be used.

For example, one subframe may be referred to as a transmission time interval (TTI), a plurality of consecutive subframes may be referred to as TTI, or one slot or one mini slot may be referred to as TTI. That is, at least one of the subframe and TTI may be a subframe (1 ms) in the conventional LTE, may be a period shorter than 1 ms (for example, 1 to 13 symbols), or may be a period longer than 1 ms. Note that, unit representing TTI may be referred to as a slot, a mini slot, and the like, but not a subframe.

Here, TTI, for example, indicates minimum time unit of scheduling in radio communication. For example, in an LTE system, the base station performs scheduling for allocating a radio resource (a frequency bandwidth, transmission power, and the like that can be used in each of the terminals 20) in TTI unit, with respect to each of the terminals 20. Note that, the definition of TTI is not limited thereto.

TTI may be transmission time unit of a data packet (a transport block), a code block, a codeword, and the like that are subjected to channel coding, or may be processing unit of scheduling, link adaptation, and the like. Note that, when TTI is applied, a time zone in which the transport block, the code block, the codeword, and the like are actually mapped (for example, the number of symbols) may be shorter than TTI.

Note that, in a case where one slot or one mini slot is referred to as TTI, one or more TTIs (that is, one or more slots or one or more mini slots) may be the minimum time unit of the scheduling. In addition, the number of slots (the number of mini slots) configuring the minimum time unit of the scheduling may be controlled.

TTI having a time length of 1 ms may be referred to as a normal TTI (TTI in LTE Rel. 8-12), a normal TTI, a long TTI, a normal subframe, a normal subframe, a long subframe, a slot, and the like. TTI shorter than the normal TTI may be referred to as a shortened TTI, a short TTI, a partial TTI (or a fractional TTI), a shortened subframe, a short subframe, a mini slot, a subslot, a slot, and the like.

Note that, the long TTI (for example, the normal TTI, the subframe, and the like) may be replaced with TTI having a time length of greater than or equal to 1 ms, and the short TTI (for example, the shortened TTI and the like) may be replaced with TTI having a TTI length of less than a TTI length of the long TTI and greater than or equal to 1 ms.

The resource block (RB) is resource allocation unit of the time domain and the frequency domain, and may include one or a plurality of consecutive subcarriers in the frequency domain. The number of subcarriers included in RB may be the same regardless of the numerology, or for example, may be 12. The number of subcarriers included in RB may be decided based on the numerology.

In addition, the time domain of RB may include one or a plurality of symbols, or may be the length of one slot, one mini slot, one subframe, or one TTI. One TTI, one subframe, and the like may be respectively configured of one or a plurality of resource blocks.

Note that, one or a plurality of RBs may be referred to as a physical resource block (physical RB: PRB), a subcarrier group (SCG), a resource element group (REG), a PRB pair, an RB pair, and the like.

In addition, the resource block may be configured of one or a plurality of resource elements (RE). For example, one RE may be a radio resource domain of one subcarrier and one symbol.

A bandwidth part (BWP) (may be referred to as a part bandwidth or the like) may represent a subset of consecutive common resource blocks (common RBs) for certain numerology, in a certain carrier. Here, the common RB may be specified by an index of RB based on a common reference point of the carrier. PRB may be defined by a certain BWP, and may be numbered within BWP.

BWP may include BWP for UL (UL BWP) and BWP for DL (DL BWP). In UE, one or a plurality of BWPs may be configured within one carrier.

At least one of the configured BWPs may be active, and it need not be assumed that the UE transmits and receives a predetermined signal/channel out of the active BWP. Note that, the "cell", the "carrier", and the like in this disclosure may be replaced with "BWP".

The structure of the radio frame, the subframe, the slot, the mini slot, the symbol, and the like, described above, is merely an example. For example, the configuration of the number of subframes included in the radio frame, the number of slots per a subframe or a radio frame, the number of mini slots included in the slot, the number of symbols and RBs included in the slot or a mini slot, the number of subcarriers included in RB, the number of symbols in TTI, a symbol length, a cyclic prefix (CP) length, and the like can be variously changed.

In this disclosure, for example, in a case where articles such as a, an, and the are added by translation, this disclosure may include a case where nouns following the articles are in the plural.

In this disclosure, the term "A and B are different" may indicate "A and B are different from each other". Note that, the term may indicate "A and B are both different from C". The terms "separated", "coupled", and the like may be interpreted as with "being different".

Each aspect/embodiment described in this disclosure may be independently used, may be used by being combined, or may be used by being switched in accordance with execution. In addition, the notification of predetermined information (for example, the notification of "being X") is not limited to being performed explicitly, and may be performed implicitly (for example, the notification of the predetermined information is not performed).

Note that, in this disclosure, DCI is an example of the control information.

As described above, this disclosure has been described in detail, but it is obvious to a person skilled in the art that this disclosure is not limited to the embodiment described in this disclosure. This disclosure can be implemented as corrected and changed modes without departing from the spirit and scope of this disclosure defined by the description of the claims. Therefore, the description in this disclosure is for illustrative purposes and does not have any limiting meaning with respect to this disclosure.

EXPLANATIONS OF LETTERS OR NUMERALS

10 BASE STATION
110 TRANSMITTING UNIT
120 RECEIVING UNIT
130 CONFIGURATION UNIT
140 CONTROL UNIT
20 TERMINAL
210 TRANSMITTING UNIT
220 RECEIVING UNIT
230 CONFIGURATION UNIT
240 CONTROL UNIT
30 CORE NETWORK
1001 PROCESSOR
1002 STORAGE UNIT
1003 AUXILIARY STORAGE UNIT
1004 COMMUNICATION UNIT
1005 INPUT UNIT
1006 OUTPUT UNIT

The invention claimed is:

1. A terminal comprising:

a receiver that receives, from a base station, downlink control information for scheduling a plurality of cells; and a processor that controls scheduling of a shared channel based on the downlink control information, wherein the downlink control information includes, for each of the plurality of cells:

first information indicating a modulation and coding scheme;

second information indicating whether new data or retransmission data is to be transmitted; and third information specifying a coding method used for retransmission, wherein a transport block transmitted via the shared channel includes a first transport block and a second transport block different from the first transport block, wherein the first information, the second information, and the third information are set for each of the plurality of cells, in a single DCI format, and for each of the first transport block and the second transport block, in the single DCI format, wherein, for each of the plurality of cells, the first information includes a field of 5 bits, the second information includes a field of 1 bit, and the third information includes a field of 2 bits, wherein a size of a format of the downlink control information is larger than sizes of DCI format 1_0 and DCI format 0_0, and wherein the size of the format of the downlink control information changes according to a configuration for the format of the downlink control information.

2. A base station comprising:

a transmitter that transmits, to a terminal, downlink control information for scheduling a plurality of cells; and a processor that controls scheduling of a shared channel with the terminal based on the downlink control information, wherein the downlink control information includes, for each of the plurality of cells:

first information indicating a modulation and coding scheme;

second information indicating whether new data or retransmission data is to be transmitted; and third information specifying a coding method used for retransmission, wherein a transport block transmitted via the shared channel includes a first transport block and a second transport block different from the first transport block, wherein the first information, the second information, and the third information are set for each of the plurality of cells, in a single DCI format, and for each of the first transport block and the second transport block, in the single DCI format, wherein, for each of the plurality of cells, the first information includes a field of 5 bits, the second information includes a field of 1 bit, and the third information includes a field of 2 bits, wherein a size of a format of the downlink control information is larger than sizes of DCI format 1_0 and DCI format 0_0, and wherein the size of the format of the downlink control information changes according to a configuration for the format of the downlink control information.

* * * * *